Patented Jan. 17, 1933

1,894,785

UNITED STATES PATENT OFFICE

EDWARD B. PECK, OF ELIZABETH, NEW JERSEY, ASSIGNOR TO STANDARD-I. G. COMPANY

PROCESS FOR REACTIVATION OF CATALYST USED FOR THE HYDROGENATION OF HYDROCARBON OILS

No Drawing.   Application filed November 13, 1929.   Serial No. 407,019.

The present invention relates to the destructive hydrogenation of hydrocarbon oils and more specifically to an improved method for reactivation of catalyst used for destructive hydrogenation. My invention will be fully understood from the following description.

In the hydrogenation of hydrocarbon oils with suitable catalytic agents, I have observed that there is a steady decrease in catalytic activity which is not due to the ordinary poisoning by sulphur or other similar materials. I have discovered that the catalyst can be readily reactivated by treatment with hydrogen either at ordinary temperatures or elevated temperatures and at either low or high pressure.

Catalytic destructive hydrogenation may be carried out in any well known manner, for example, a body of oil containing suspended catalyst may be held at an elevated temperature, say above about 750° F. and under hydrogen pressure in excess of about 50 atmospheres. Hydrogen or gas containing substantial quantities of free hydrogen is forced into the oil continuously and either oil vapor alone or both liquid and vapor are removed. Fresh oil may also be added.

The catalyst may be removed continuously or at intervals and separated from the bulk of the oil by centrifugal action, settling or filtration or any other suitable mechanical means and then the catalyst is subjected to the action of a stream of gas comprising hydrogen of substantial purity. During such treatment temperature may be normal or higher but preferably below about 700° F. Pressure may be at atmospheric but it is advantageous for it to be higher, say above 50 atmospheres.

The time of treatment differs with the condition of the spent catalyst and the nature of its composition but in general treatment should be from 2 to 12 hours or more. The catalyst is then suspended in oil, for example, the fresh feed and returned to the retort for further use.

I have found that the gas from the hydrogenation retort containing principally hydrogen with, hydrocarbons and hydrogen sulphide in less proportion is a suitable reactivating medium but it is preferable to scrub this gas with oil under pressure to remove the major quantity of hydrocarbon constituents prior to its use. If an unscrubbed gas is used, I find it desirable to pass hydrogen of substantial purity over the catalyst for a short time before returning it to the hydrogenation retort. Diluents such as CO, $CO_2$ and $N_2$ are not objectionable, but the amount of hydrocarbons should be kept low in the reactivating gas.

The catalysts referred to above comprise the oxides or sulphides of chromium, molybdenum, tungsten and similar high atomic weight elements either alone or in admixture with each other or with the oxides or sulphides of such metals as those of the alkali, alkaline earth and rare earth groups, aluminum, zinc and the like. All of these materials are sulphactive, that is are immune to poisoning by sulfur.

My invention is not to be limited by any theory of the mechanism of the reactivation process, nor to any details which may have been included for illustrative purposes, but only by the following claims in which I wish to claim all novelty inherent in my invention.

I claim:

1. An improved process for reactivating sulphactive catalyst used for destructive hydrogenation of hydrocarbon oil, which comprises separating the bulk of the oil from the catalyst and subjecting the catalyst for a prolonged period to the action of a gas comprising free hydrogen substantially free of hydrocarbons.

2. An improved process according to claim 1, in which the reactivation is accomplished at an elevated temperature.

3. An improved process according to claim 1, in which the reactivation is accomplished under pressure in excess of 50 atmospheres.

4. An improved process for the reactivation of solid sulphactive catalytic material used in the destructive hydrogenation of hydrocarbon oil, which comprises separating the bulk of the oil from the catalyst and subjecting the solid material to the action of vapors derived from the hydrogenation retort.

5. Process according to claim 4, in which the vapors from the hydrogenation retort are scrubbed with oil under pressure to remove the major quantity of liquid hydrocarbon prior to passage through the spent catalyst.

6. Process according to claim 4, in which hydrogen substantially free of hydrocarbon is passed through the catalyst for a short period after passage of vapor derived from the hydrogenation retort.

7. An improved process for the reactivation of spent sulphactive catalyst used for the destructive hydrogenation of hydrocarbon oils, which comprises removing the bulk of the oil and subjecting the spent solid catalyst to the action of gas containing a substantial proportion of free hydrogen at temperature below about 700° F.

8. An improved process for the reactivation of spent sulphactive catalyst used for the destructive hydrogenation of hydrocarbon oils, which comprises removing the bulk of the oil and subjecting the spent solid catalyst to the action of gas containing a substantial proportion of free hydrogen at temperature below about 700° F. and under pressure in excess of 50 atmospheres.

EDWARD B. PECK.